United States Patent [19]

Kano et al.

[11] Patent Number: 4,741,993

[45] Date of Patent: May 3, 1988

[54] RADIATION IMAGE STORAGE PANEL

[75] Inventors: Akiko Kano; Hisanori Tsuchino; Koji Amitani; Fumio Shimada, all of Hino, Japan

[73] Assignee: Konishiroku Photo Industry Co., Ltd., Tokyo, Japan

[21] Appl. No.: 883,596

[22] Filed: Jul. 9, 1986

[30] Foreign Application Priority Data

Jul. 15, 1985 [JP] Japan ................................ 60-156346

[51] Int. Cl.$^4$ ........................ G03C 1/76; G01N 21/64

[52] U.S. Cl. .................................... 430/536; 430/139; 430/531; 250/484.1; 250/488.1

[58] Field of Search ........................ 430/139, 536, 531; 250/488.1, 484.1

[56] References Cited

U.S. PATENT DOCUMENTS 4,617,468 10/1986 Shiraishi et al. ................. 250/484.1

FOREIGN PATENT DOCUMENTS 0126218 11/1984 European Pat. Off. ......... 250/484.1

*Primary Examiner*—Paul R. Michl
*Assistant Examiner*—Lee C. Wright
*Attorney, Agent, or Firm*—Frishauf, Holtz, Goodman & Woodward

[57] ABSTRACT

Disclosed is a radiation image storage panel having at least one stimulable phosphor layer on a support and a protective layer provided on the stimulable phosphor layer, wherein the protective layer comprises at least two layers of which regains under a relative humidity of 90% on a sorption isotherm at 25° C. are different by 0.5% or more.

According to this invention, a radiation image storage panel which has good humidity resistance and can be used for a long term is obtained.

11 Claims, 2 Drawing Sheets

RADIATION IMAGE STORAGE PANEL

BACKGROUND OF THE INVENTION

This invention relates to a radiation image storage panel using a stimulable phosphor, more particularly to a radiation image storage panel which can be used for a long term.

A radiation image such as X-ray image is frequently used for diagnosis of diseases, etc. For obtaining such X-ray image, there have been used the so-called radiation photograph. These are obtained by irradiating X-ray transmitted through a subject onto a phosphor layer (fluorecent screen) to produce a visible light and passing the visible light to a film using silver salt such as used in taking conventional photographs, and consequently developing the film. However, in recent years, methods of forming images directly from the phosphor layer without use of a film coated with a silver salt have been devised.

As such a method, there is a method for imaging in which a radiation transmitted through a subject is absorbed onto a phosphor, then the phosphor is excited with, for example, light or heat energy to thereby permit the radiation energy accumulated in this phosphor by the above absorption to be radiated as fluorescence, and the fluorescence is detected. Specifically, for example, U.S. Pat. No. 3,859,597 and Japanese Unexamined Patent Publication No. 12144/1980 discloses a radiation image storage method employing a stimulable phosphor with a visible light or infrared ray as a stimulating excitation light. This method employs a radiation image storage panel having a stimulable phosphor layer on a support. In this method, radiation transmitted through a subject fall on the stimulable phosphor layer in the radiation image storage panel to accumulate radiation energy corresponding to the radiation transmission degrees at respective portions of the subject and form a latent image, then the stimulable phosphor layer is scanned with a stimulating excitation light, thereby the radiation energy accumulated at the respective portions is permitted to irradiate to be converted to light, and subsequently an image is obtained according to the optical signals depending on the intensity of the light. The thus obtained final image may be reproduced as a hard copy or reproduced on CRT.

Since the radiation image storage panel used in such a radiation image storage method radiates the accumulated energy by scanning with a excitation light after the accumulation of a radiation image information, it can accumulate again a radiation image after the scanning and can be used repeatedly.

Accordingly, the above-mentioned radiation image storage panel desirably to have a property that it can be used for a long term or used many times repeatedly without deterioration of image quality of the radiation image to be obtained. For the above, the stimulable phosphor layer in the above-mentioned radiation image storage panel is required to be sufficiently protected from physical or chemical stimuli from outside.

Particularly, when the above-mentioned stimulable phosphor layer absorbs moisture, radiation sensitivity of the above-mentioned radiation image storage panel is reduced or a retention time of the accumulated energy before irradiation of the excitation light is shortened to give rise to deterioration of the image quality of the obtained radiation image. These changes are reversible, namely, the properties of the panel can be returned to the condition before absorption of moisture by removal of moisture absorbed in the stimulable phosphor layer. Therefore, it has been desired to protect the stimulable phosphor layer from moisture reaching a surface of the stimulable phosphor layer.

In order to solve the above problems, the prior art has adopted a method in which a protective layer is provided on a surface of a stimulable phosphor layer on a support of a radiation image storage panel.

This protective layer is formed by, for example, a method in which a coating liquid for the protective layer is applied directly on the stimulable phosphor layer or a method in which a protective layer preliminarily formed separately is adhered onto the stimulable phosphor layer, as described in Japanese Unexamined Patent Publication No. 42500/1984.

Further, in Japanese Patent Application No. 18934/1985, the present inventors have proposed a method for forming a protective layer by applying on a stimulable phosphor layer a coating liquid for the protective layer containing regin material such as monomer, oligomer or polymer (hereinafter referred to as a radiation curring type resin or thermosetting resin) which may be polycondensated or crosslinked by irradiation of radiation and/or heating to be cured, and subsequently curing the regin material by irradiation of radiation and/or heating.

In order to accomplish the elongation of lifetime of a radiation image storage panel, further improvement, particularly, with respect to the humidity resistance, has been desired. However, in the present states, any method for reducing the water vapor permeability of a protective layer has been hardly studied.

SUMMARY OF THE INVENTION

This invention has been accomplished in consideration of such present states in a radiation image storage panel. An object of this invention is to provide a radiation image storage panel which undergoes reduced permeation of moisture to the stimulable phosphor layer and can be used for a long term under good conditions.

The above-mentioned object of this invention is accomplished by a radiation image storage panel having at least one stimulable phosphor layer on a support and a protective layer provided on said stimulable phosphor layer, wherein said protective layer comprises at least two layers of which regains (moisture regains) under a relative humidity of 90% on a sorption isotherm at 25° C. are different by 0.5% or more.

DESCRIPTION OF THE PREFERRED EMBODIMENTS

This invention is to be described in detail below.

Here, the expression "regains (moisture regains) for the relative humidity of 90% on a sorption isotherm at 25° C. being different by 0.5% or more" means as follows. That is to say, a regain is represented in percentage of a moisture absorbed by a substance per weight of the substance in a drying state. Assuming that the protective layer is constituted of layer A and layer B, when the de-sorption isotherm is prepared at 25° C. for the layers A and B, the regain (moisture regain) of one layer at the relative humidity of 90% differs by 0.5% or more from that of the other layer at the same relative humidity.

Figure 1:
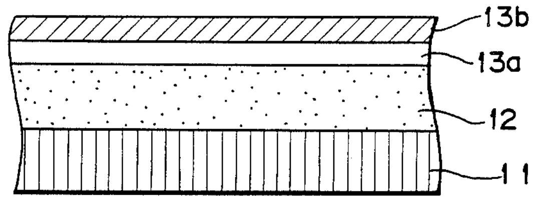
FIG. 1 is a sectional view showing a fundamental construction of the radiation image storage panel of this invention.

FIG. 1 is a sectional view showing an example of a construction of the radiation image storage panel of this invention. In the same Figure, 11 is a support, 12 a stimulable phosphor layer, and 13*a* and 13*b* protective layers. 13*a* being in contact with the stimulable phosphor layer is a protective layer having relatively larger regain and 13*b* provided on the most outer portion of the panel is a protective layer having relatively smaller regain. It is preferred to constitute the construction of the layers as shown in FIG. 1 for improving the humidity resistance of the radiation image storage panel. That is to say, water or steam existing on the outside of the radiation image storage layer is firstly prevented to permeate into the radiation image storage panel by the protective layer 13*b*. However, it is impossible for the protective layer 13*b* to completely intercept permeation of moisture, and thus a certain amount of moisture always transmit through the layer 13*b*. The amount of the moisture transmitted through the layer 13*b* generally increases in proportion to the difference of humidities at the outside and the innerside of the protective layer 13*b*. The moisture transmitted through the protective layer 13*b* reaches to a surface of the protective layer 13*a*, but the protective layer 13*a* maintains the moisture at its surface being in contact with the layer 13*b* and in the layer 13*a* due to its large regain, and thus functions to prevent moisture from reaching the stimulable phosphor layer. As a result, deterioration of the stimulable phosphor layer by the absorption of the moisture is greatly reduced as compared with those of conventional radiation image storage panels.

Further, a composite protective layer having the layer structure as shown in FIG. 1 may preferably have a very small water vapor transmission rate in the direction of from 13*b* to 13*a* and a relatively large water vapor transmission rate in the direction of from 13*a* to 13*b* by selecting suitable materials for the protective layers. In general, a film having small regain has such a property that water vapor permeability coefficient has small dependency on humidity and a film having large regain has such a property that water vapor permeability coefficient has large dependency on humidity. Accordingly, the protective layer 13*b* is low in dependency on humidity of water vapor permeability coefficient and the protective layer 13*a* is high in dependency on humidity of water vapor permeability coefficient, thus the complex system of the both layers shows two facedness of water vapor transmission in a well known complex film. That is to say, when the layer 13*b* is placed on a high humidity side, the water vapor permeability of the composite layer is smaller than those when the layer 13*a* is placed on a high humidity side. If the difference in water vapor permeabilities between both layers is enlarged by the proper selection of materials for the protective layers, there is prepared a radiation image storage panel which is excellent in humidity resistance and, when the stimilable phosphor layer absorbs moisture, can release the moisture rapidly by exposing it to the atomosphere being low in humidity.

Further, in the protective layer, it is preferred that the outermost layer has lower regain than those of the inner layer or layers. In other words, the protective layer may be constituted of three of more layers. In this case, preferred is, for example, those in which the regain becomes higher as being innerside layer.

The structure of the radiation image storage panel of this invention should not be limited to the example as shown in FIG. 1.

In the radiation image storage panel of this invention, at least outermost protective layer of two or more protective layers covering the surface of the stimulable phosphor layer in the radiation image storage panel of this invention is preferably a layer having high surface hardness. By providing the protective layer having high surface hardness, there may be prevented the occurance of flaws to be generated by physical shock received from panel transportation system other mechanical parts during the repeated operations of the radiation image storage panel and the consequential deterioration of image quality of the radiation image.

In the above-mentioned outermost protective layer of the two or more protective layers, the water vapor transmission rate according to JIS (Japanese Industrial Standard) Z-208B is preferably 500 $g/m^2 \cdot 24$ hrs or less at the temperature of 40° C. and at the relative humidity of 90%. Here, the water vapor transmission rate is defined as follows. In a phenomenon that moisture permeate through a film, when the permeation reachs to steady state, namely, water vapor permeation speed of the film becomes to be constant, an amount of the permeated water vapor per unit area and unit time is referred to the water vapor transmission rate.

Moreover, a face to be provided with the protective layer is not limited to the face opposite to the support of the stimulable phosphor layer (referred to as a panel obverse), it may be provided to a section in a direction of thickness around the panel (referred to as a panel side face) or on a face opposite to the stimulable phosphor layer of the support (referred to as a panel reverse). At this time, for example, it is not required that the protective layers covering the panel surface and the panel back surface have the same construction each other.

The radiation image storage panel of this invention having the preferable property as described above can be prepared by, for example, according to the manner described below, forming or providing at least two desired protective layers on the stimulable phosphor layer or other surfaces after the formation of a stimulable phosphor layer on the support.

In the radiation image storage panel of this invention, various polymeric materials, glasses, metals, etc. may be used as the support. Particularly, materials which can be worked into flexible sheets or webs are preferred in handling of information recording materials. In this respect, it is preferable to use plastic films such as cellulose acetate film, polyester film, polyethyleneterephthalate film, polyamide film, polyimide film, triacetate film, polycarbonate film, etc.; metal sheets such as of aluminum, iron, copper, chromium, etc. or metal sheets having coated layers of the oxides of said metals.

These supports may have thicknesses, which may differ depending on the material of the support, may generally be 80 μm to 1,000 μm, more preferably 80 μm to 500 μm from the standpoint of handing.

The surface of such a support may be smooth or it may be formed in matt surface for improvement of adhesion with the stimulable phosphor layer. It may also be formed in a concave-convex surface or a construction in which separated fine tile-like plates are gravelled.

Further, these supports may be provided with a subbing layer on a surface on which the stimulable phosphor layer is provided for improvement of adhesion with the stimulable phosphor layer.

The stimulable phosphor in the radiation image storage panel of this invention refers to a phosphor exhibiting stimulated emission corresponding to the dose of the first light or high energy radiation by optical, thermal, mechanical or electrical stimulation (stimulating excitation) after irradiation of the first light or high energy radiation, preferably a phosphor exhibiting stimulated emission by a stimulating excitation light of 500 nm or longer. As the stimulable phosphor to be used for the radiation image storage panel of this invention, there may be mentioned, for example, those represented by $BaSO_4$: Ax (wherein A is at least one of Dy, Tb and Tm, x is $0.001 \leqq x < 1$ mole %) as disclosed in Japanese Unexamined Patent Publication No. 80487/1973; those represented by $MgSO_4$: Ax (wherein A is either Ho or Dy, x is $0.001 \leqq x < 1$ mole %) as disclosed in Japanese Unexamined Patent Publication No. 80488/1973; those represented by $SrSO_4$:Ax (wherein A is at least one of Dy, Tb and Tm, x is $0.001 \leqq x < 1$ mole %) as disclosed in Japanese Unexamined Patent Publication No. 80489/1973; those in which at least one of Mn, Dy and Tb is added to $Na_2SO_4$, $CaSO_4$ and $BaSO_4$, etc. as disclosed in Japanese Unexamined Patent Publication No. 29889/1976; those such as BeO, LiF, $MgSO_4$ and $CaF_2$, etc. as disclosed in Japanese Unexamined Patent Publication No. 30487/1977; those such as $Li_2B_4O_7$: Cu, Ag, etc. as disclosed in Japanese Unexamined Patent Publication No. 39277/1978; those such as $Li_2O$. $(B_2O_2)x$:Cu (wherein x is $2 < x \leqq 3$) and $Li_2O$. $(B_2O_2)x$:Cu,Ag (wherein x is $2 < x \leqq 3$), etc. as disclosed in Japanese Unexamined Patent Publication No. 47883/1979; those represented by SrS:Ce,Sm, SrS:Eu,Sm, $La_2O_2S$:Eu,Sm and (Zn, Cd)S:Mn,X (wherein X is a halogen) as disclosed in U.S. Pat. No. 3,859,527. Also, ZnS:Cu,Pb phosphors as disclosed in Japanese Unexamined Patent Publication No. 12142/1980; barium aluminate phosphors represented by the formula $BaO.xAl_2O_3$:Eu (wherein $0.8 \leqq x \leqq 10$) and alkaline earth metallosilicate type phosphors represented by the formula $M^{II}O.xSiO_2$:A (wherein $M^{II}$ is Mg, Ca, Sr, Zn, Cd or Ba; A is at least one of Ce, Tb, Eu, Tm, Pb, Tl, Bi and Mn; and x is $0.5x \leqq < 2.5$) may be employed.

Additional examples of phosphors may include, as disclosed in Japanese Unexamined Patent Publication No. 12143/1980, those represented by the following formula:

$$(Ba_{1-x-y}Mg_xCa_y)FX:eEu^{+}$$

(wherein X is at least one of Br and Cl; each of x, y and e is a number satisfying the conditions of $0 < x+y \leqq 0.6$; $xy \neq 0$ and $10^{-6} \leqq e \leqq 5x\ 10^{-2}$); those as disclosed in Japanese Unexamined Patent Publication No. 12144/1980 which corresponds to U.S. Pat. No. 4,236,078:

$$LnOX:xA$$

(wherein Ln represents at least one of La, Y, Gd and Lu; X represents Cl and/or Br; A represents Ce and/or Tb; and x represents a number satisfying $0 < x < 0.1$); those as disclosed in Japanese Unexamined Patent Publication No. 12145/1980:

$$(Ba_{1-x}M^{II}x)FX:yA$$

(wherein $M^{II}$ represents at least one of Mg, Ca, Sr, Zn and Cd; X represents at least one of Cl, Br and I; A represents at least one of Eu, Tb, Ce, Tm, Dy, Pr, Ho, Nd, Yb and Er; x and y represent numbers satisfying the conditions of $0 \leqq x \leqq 0.6$ and $0 \leqq y \leqq 0.2$); those as disclosed in Japanese Unexamined Patent Publication No. 84389/1980:

$$BaFX:xCe,yA$$

(wherein X is at least one of Cl, Br and I; A is at least one of In, Tl, Gd, Sm and Zr; x and y are each $0 < x \leqq 2 \times 10^{-1}$ and $0y \leqq 5 \times 10^{-2}$); those as disclosed in Japanese Unexamined Patent Publication No. 160078/1980:

$$M^{II}FX,xA:yLn$$

(wherein $M^{II}$ is at least one of Mg, Ca, Ba, Sr, Zn and Cd; A is at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one of Eu, Tb, Ce, Tm, Dy, Pr, Ho, Nd, Yb, Er, Sm and Gd; X is at least one of Cl, Br and I; x and y are each number satisfying the conditions of $5 \times 10^{-5} \leqq x \leqq 0.5$ and $0 < y \leqq 0.2$) (rare earth element activated divalent metal fluoride phosphors);

ZnS:A, (Zn,Cd)S:A, CdS:A, ZnS:A,X and CdS:A,X (wherein A is Cu, Ag, Au or Mn; X is a halogen); those as disclosed in Japanese Unexamined Patent Publication No. 148285/1982:

$$xM_3(PO_4)_2.NX_2:yA$$

$$M_3(PO_4)_2:yA$$

(wherein each of M and N represents at least one of Mg, Ca, Sr, Ba, Zn and Cd; X represents at least one of F, Cl, Br and I; A represents at least one of Eu, Tb, Ce, Tm, Dy, Pr, Ho, Nd, Yb, Er, Sb, Tl, Mn and Sn; x and y are integers satisfying the conditions of $0 < x \leqq 6$ and $0 \leqq y \leqq 1$);

$$nReX_3.mAX'_2:XEu$$

$$nReX_3.mAX'_2:Eu,ySm$$

(wherein Re represents at least one of La, Gd, Y and Lu; A represents at least one of alkaline earth metals Ba, Sr and Ca; X and X' each represent at least one of F, Cl and Br; and x and y are integers satisfying the conditions of $1 \times 10^{-4} < x < 3 \times 10^{-1}$ and $1 \times 10^{-4} < y < 1 \times 10^{-1}$; and n/m satisfies the condition of $1 \times 10^{-3} < n/m < 7 \times 10^{-1}$) and $$M^{I}X.aM^{II}X'_2.bM^{III}X''_3:cA$$

(wherein $M^I$ is at least one alkali metal selected from Li, Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X'' are each at least one halogen selected from F, Cl, Br and I; A is at least one metal selected from Eu, Tb, Ce, Tm, Dy, Pr, Ho, Nd, Yb, Er, Gd, Lu, Sm, Y, Tl, Na, Ag, Cu and Mg; a is a numeral within the range of $0 \leq a < 0.5$, b is a numeral within the range of $0 \leq b < 0.5$ and c is a numeral within the range of $0 < c \leq 0.2$) (alkali halide phosphors). Particularly, alkali halide phosphors are preferable, because stimulable phosphor layers can be formed easily according to the method such as vacuum vapor deposition, sputtering, etc.

However, the stimulable phosphor to be used in the radiation image storage panel of this invention is not limited to those as described above, but any phosphor which can exhibit stimulated fluorescence when irradiated with a stimulating excitation light after irradiation of radiation may be useful.

The radiation image storage panel of this invention may have a group of stimulable phosphor layers containing one or more stimulable phosphor layers comprising at least one of the stimulable phosphors as mentioned above. The stimulable phosphors to be contained in respective stimulable phosphor layers may be either identical or different.

The stimulable phosphor layer may be formed by, as described in Japanese Patent Applicaiton No. 196365/1984, employing the method such as vapor deposition, sputtering, etc. to form, on a support, a stimulable phosphor layer as a stratified part without any binder, or by dispersing the stimulable phosphor into a proper binder to prepare a coating liquid and coating it on a support.

In cases where a binder is employed in the radiation image storage panel of this invention, there may be used binders generally employed for constitution of layers, for example, proteins such as gelatin; polysaccharide such as dextran; gum arabic, poly(vinyl butyral), poly(vinyl acetate), nitrocellulose, ethylcellulose, vinylidene chloride-vinyl chloride copolymer, poly(methyl methacraylate), vinyl chloride-vinyl acetate copolymer, polyurethane, cellulose acetate butylate, poly(vinyl alcohol), etc.

However, in the radiation image storage panel of this invention, the stimulable phosphor layer may preferably be of a structure containing no binder material, as proposed particularly in Japanese Patent Application No. 196365/1984. As the methods for forming the stimulable phosphor layer without any binder, there may be mentioned the following ones.

A first method is the vacuum deposition method. In this method, a support is first set in a vacuum deposition device and the device is evacuated to a vacuum degree of about $10^{-6}$ Torr. Then, at least one of the above stimulable phosphors is evaporated by heating according to the resistance heating method, the electron beam method, etc. to have the stimulable phosphor with a desired thickness deposited on the above support surface.

As a result, a stimulable phosphor layer containing no binder is formed, and it is also possible to form the stimulable phosphor for plural divided times in the above vapor deposition step. Also, in the above vapor deposition step, a plurality of resistance heaters or electron beams may be employed to effect co-deposition.

Further, in the above vapor deposition method, the subject on which vapor deposition is effected may be cooled or heated, if desired. Also, after completion of vapor deposition, the stimulable phosphor layer may be subjected to heating treatment.

A second method is the sputtering method. In this method, after a support is set in a sputter device similarly as in the vapor deposition method, the device is once internally evacuated to a vacuum degree of about $10^{-6}$ Torr, and then an inert gas such as Ar, Ne, etc. is introduced as the gas for sputter into the sputter device to adjust the gas pressure at about $10^{-3}$ Torr.

Then, using the above stimulable phosphor as the target, sputtering is effected to deposit the stimulable phosphor on the above support surface to a desired thickness.

In the above sputter step, the stimulable phosphor layer can be formed for plural divided times similarly as in the vacuum vapor deposition method, or alternatively the stimulable phosphor layer can be formed by use of a plurality of targets comprising stimulable phosphors different from each other by sputtering at the same time or successively the above targets.

In the above sputter method, it is also possible to use a plurality of starting materials for the stimulable phosphor as the targets and sputtering these at the same time or successively to form a stimulable phosphor layer simultaneously with synthesis of the desired stimulable phosphor on the support. Alternatively, in the above sputter method, reactive sputter may also be conducted by introducing a gas such as $O_2$, $H_2$, etc., if necessary.

Further, in the above sputter method, the subject to be sputtered thereon may be either cooled or heated. Also, the stimulable phosphor layer may be subjected to heat treatment after completion of sputter.

A third method is the CVD method. According to this method, an organometallic compound containing the desired stimulable phosphor or starting materials therefor is decomposed with an energy such as heat, high frequency power, etc., thereby obtaining a stimulable phosphor layer containing no binder.

The thickness of the stimulable phosphor layer in the panel of this invention, which may differ depending on the sensitivity of the radiation image storage panel to radiation, the kind of the stimulable phosphor, etc., may preferably be within the range of from 10 to 1,000 μm, more preferably from 20 to 800 μm when no binder is contained, or alternatively, when binder is contained, it may be within the range of from 10 to 1,000 μm, more preferably from 20 to 500 μm.

The forth method is the spraying method. According to this method, stimulable phosphor powders are sprayed on an adhesive layer, thereby obtaining a stimulable phosphor layer containing no binder.

For improvement of sharpness of radiation image to be obtained, the radiation image storage panel may have, for example, a structure in which the stimulable phosphor layer has a fine pillar-shaped brock structure and extends to substantially vertical direction against the support as described in Japanese Unexamined Patent Publication No. 266912/1984; a structure constituted of a support having a large number of fine concave-convex pattern on its surface and a stimulable phosphor layer comprising fine pillar-shaped brock structure and the above surface structure inherited therein as described in Japanese Unexamined Patent Publication No. 266913/1984; a structure constituted of a support having a surface structure in which a large number of fine tile-like plates lie while being separated from each other with fine gaps and a stimulable phosphor layer comprising fine pillar-shaped brock structure and the above surface structure inherited therein as described in Japanese Unexamined Patent Publication No. 266914/1984; a structure constituted of a large number of fine tile-like plates on a support surface, a fine strings net surrounding said fine tile-like plates and separating them from each other, and a stimulable phosphor layer with a fine pillar-shaped structure extending in the thickness direction on said fine tile-like plates as described in Japanese Unexamined Patent Publication No. 266915/1984; and a structure with a stimulable phosphor layer comprising a fine pillar-shaped block structure having crevases developed from the gap between the fine gaps toward the layer surface by applying a shock treatment on a stimulable phosphor layer deposited in the thickness direction on the surfaces of the fine tile-like plates distributed in a large number and scattered with gaps therebetween as described in Japanese Unexamined Patent Publicatioin No. 266916/1984.

To improve similarly the sharpness of the radiation image obtained in the radiation image storage panel of this invention, the stimulable phosphor layer may contain white powder therein or may be colored by colorant which absorbs the stimulable excitation light. Alternatively, an optical reflection layer containing white pigment may be provided between the support and the stimulable phosphor layer.

Next, a protective layer is provided to the surface opposite to the support of the stimulable phosphor layer or, if necessary, on the other faces thereof. As a process for forming the protective layers, the processes described below are employed.

As the first process, there may be mentioned a process in which a macromolecular (polymer) substances having high transparency is dissolved in a suitable solvent and the thus prepared solution is applied onto the face on which a protective layer is to be provided and dried to form a protective layer as disclosed in Japanese Unexamined Patent Publication No. 42500/1984.

As the second process, there may be mentioned a process in which a suitable adhesive is provided onto one side of a film comprising a transparent macromolecular substance and the film is adhered onto the face on which a protective layer is to be provided as also disclosed in Japanese Unexamined Patent Publication No. 42500/1984.

As the materials for the protective layers used for the above first and second processes, there may be mentioned, for example, cellulose derivatives such as cellulose acetate, nitrocellulose and ethylcellulose; or poly(-methyl methacrylate), poly(vinyl butyral), poly(vinyl formal), polycarbonate, poly(vinyl acetate), polyacrylonitrile, polymethylallyl alcohol, polymethylvinylketone, cellulose diacetate, cellulose triacetate, poly(vinyl alcohol), polyacrylic acid, polymethacrylic acid, polyglycine, polyacrylamide, poly(vinylpyrrolidone), polyvinylamine, polyethylene terephthalate, polyethylene, poly(vinylidene chloride), poly(vinyl chloride), polyamide (Nylon), polytetrafluoroethylene, polytrifluorochloroethylene, polypropylene, tetrafluoroethylenehexafluoro propylene copolymer, poly(vinyl isobutyl ether), polystyrene, etc.

As the third process, as disclosed in Japanese Patent Application No. 18934/1985, there is a process in which a coating liquid containing at least one of radiation curing type resin and thermosetting resin is applied onto a face on which a protective layer is to be provided and is subjected to the irradiation of radiation, such as, ultraviolet ray or electron beam and/or heating by use of an apparatus as also disclosed in Japanese Patent Application No. 18394/1985 to carry out curing of the coating liquid.

As the radiation curing type resin mentioned above, there may be employed compounds having unsaturated double bond or composition containing them. Such compounds are preferably pre-polymer and/or olygomer having two or more double bonds, and they may further contain a monomer (vinylmonomer) having unsaturated double bond as a reactive diluent. As the pre-polymer or olygomer having two or more unsaturated double bonds, there may be exemplified the followings:

(1) Unsaturated polyesters
(2) Modified unsaturated polyesters
urethane modified unsaturated polyester, acrylic urethane modified unsaturated polyester, and a liquid unsaturated polyester having an acrylic group at a terminal
(3) Acrylic polymers polyesteracrylate, epoxyacrylate, siliconeacrylate and urethaneacrylate
(4) Butadiene series polymer
(5) Epoxy series polymer
polyglycidyl ether of aliphatic polyol, bisphenol A (or F, S) diglycidyl ether, dicarboxylic acid epoxycyclohexylalkyl and epoxide containing one or two or more cyclopenteneoxide group
(6) Polythiol.polyene resin As the above-mentioned thermosetting resin according to this invention, there may be exemplified epoxy resins, alkyd resins, amino resins, unsaturated polyester resins, polyurethane resins, silicone resins, etc.

The radiation curing type resin and thermosetting resin mentioned above may be employed alone or as a mixture of two or more.

To the polymer which is the above-mentioned radiation curing type resin and/or thermosetting resin, there may be added, if necessary, a vinylmonomer as a reactive diluent, a non-reactive binder, a crosslinking agent, a photopolymerization initiator, a photosensitizer, a storage stabilizer, an adhesion imprȯver, and other additives, and then dispersed therein to prepare the coating liquid for the protective layer.

Here, as the above-mentioned reactive diluent effecting to reduce the viscosity of the composition and enhance the radiation-curing rate, there may be exemplified the following:

(a) Mono-functional monomers
methyl acrylate, ethyl acrylate, butyl acrylate, 2-ethylhexyl methacrylate, 2-hydroxyethyl acrylate, 2-hydroxyethyl methacrylate, glycidyl methacrylate, n-hexyl acrylate, lauryl acrylate, etc.
(b) Di-functional monomers
1,6-hexanediol diacrylate, 1,6-hexanediol dimethacrylate, neopentylglycol, 1,4-butanediol diacrylate, ethyleneglycol diacrylate, polyethyleneglycol diacrylate, pentaerythritol diacrylate, divinylbenzene, etc.
(c) Tri- or more- functional monomers
trimethylolpropane triacrylate, trimethylolpropane trimethacrylate, pentaerythritol triacrylate, dipentaerythritol hexaacrylate, an acrylate of ethylenediamine, etc.

In the above-mentioned coating liquid for the protective layer, a binder which is not cured by irradiation or heating may be optionally contained. For example, there may be included cellulose ester, poly(vinyl butyral), poly(vinyl acetate), vinyl chloride-vinyl acetate copolymer, styrol-acrylic acid copolymer, If the irradiation of ultraviolet ray is employed as a means for curing the above-mentioned coating liquid for the protective layer, there is added, photopolymerization initiator which is a catalyst to initiate the polymerization by absorption of ultraviolet ray energy, and further added photosensitizer for accelerating the effect of the photopolymerization initiator. As the above-mentioned photopolymerization initiator, carbonyl compounds are frequently employed and are exemplified, for example, benzoinether series compounds such as benzoin isopropyl, isobutylether; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-alkylthioxanthone; and compounds such as 2-hydroxy-2-methylpropiophenone, 2-hydroxy-4'- isopropyl-2-methylpropiophenone, 1-hydroxycyclohexylphenylketone; etc.

Moreover, as a photopolymerization initiator, particularly, for epoxy series polymers, there may be useful an aromatic onium salt, namely, a diazonium salt such as a diazonium salt of a Lewis acid; a phosphonium salt such as a hexafluorophosphoric triphenylphenacylphosphonium salt; a sulfonium salt such as a tetrafluoroboric triphenylsulfonium, hexafluoroboric triphenylsulfonium; and an iodonium salt such as chlorodiphenyl iodonium; etc. As the others, sulfuric compounds, azo compounds, halogen compounds, organic peroxides, etc. may be employed as photopolymerization initiator.

The above-mentioned photopolymerization initiator may be used alone or as a mixture of two or more.

As the examples of the photosensitizer, there may be mentioned amine, urine, nitrile and compounds of sulfur, phosphor, nitrogen, chlorine, etc.

A thickness of one layer of the protective layers formed according to the above-mentioned first, second and third processes may be within the range of from 1 to 100 μm, more preferably from 2 to 50 μm.

As the fourth process, there may be mentioned a process in which inorganic substance layers of $SiO_2$, SiC, SiN, $Al_2O_3$, etc are formed according to vacuum vapor deposition method, sputtering method, etc. A thickness of the above-mentioned iorganic substance layer is preferably within the range of from about 0.1 to 100 μm.

In this invention, at least two protective layers of the radiation image storage panel of the present invention are not required to be formed so that the whole layers are prepared in the same forming process. The radiation image storage panel of this invention may be prepared by, after providing of a stimulable phosphor layer on the support, forming succesively several protective layers on the stimulable phosphor layer, or by providing a previously prepared multi-layer structural protective layers onto the stimulable phosphor layer. Alternatively, a manner in which the support is provided after formation of the stimulable phosphor layer on the protective layer may be employed.

In the radiation image storage panel of this invention, the protective layer comprises a combination of two or more layers which are different by 0.5% or more in regains for the relative humidity of 90% on a sorption isotherm at 25° C.

In the above-mentioned protective layers, the regain of the protective layer which has relatively small regain is preferably 5% or less. On the other hand, the regain of the protective layer which has relatively large regain is preferably more than 0.5%.

As the material used for the protective layer having a relatively small regain, there may preferably be mentioned, for example, polyethylene, polytetrafluoroethylene, polytrifluoro-ethylenechloride, polypropylene, tetrafluoroethylene-hexafluoropropylene copolymer, poly(vinylidene chloride), poly(vinyl isobutyl ether), polyethylene terephthalate, vinylidene chloride-vinyl chloride copolymer, vinylidene chloride-acrylonitrile copolymer, vinylidene chloride-isobutylene copolymer, polystyrene, poly(vinyl chloride), vinyl chloride-vinyl acetate copolymer, vinyl chloride-diethyl fumarate copolymer, polymethyl methacrylate, polyacrylonitrile, ethylcellulose, nitrocellulose, a part of epoxy series polymers and a part of acrylic polymer. While, as the material used for the protective layer having relatively large regain, there may preferably be mentioned, for example, poly(vinyl alcohol), polyacrylamide, polyglycin, polymethacrylic acid, polyacrylic acid, poly(vinyl pyrrolidone), poly(vinylamine), cellulose diacetate, cellulose triacetate, nylon 4, nylon 6, nylon 12, nylon 66, poly(vinyl acetate), polymethylallyl alcohol, cellulose acetate, nitrocellulose, ethylcellulose, polyurethane, polymethylvinylketone, polyacrylonitrile, poly(methyl methacrylate), poly(vinyl chloride) and polyethylene terephthalate.

A radiation image storage panel according to the particularly preferred embodiment of this invention has a complex protective layers prepared by selecting at least one from the group of materials mentioned above as the material for the protective layer having small regain and at least one from the group of materials mentioned above as the material for the protective layer having large regain, and then arranging the former to an outside and the later to an innerside, namely, a face being contact with the stimulable phosphor layer.

Figure 2:
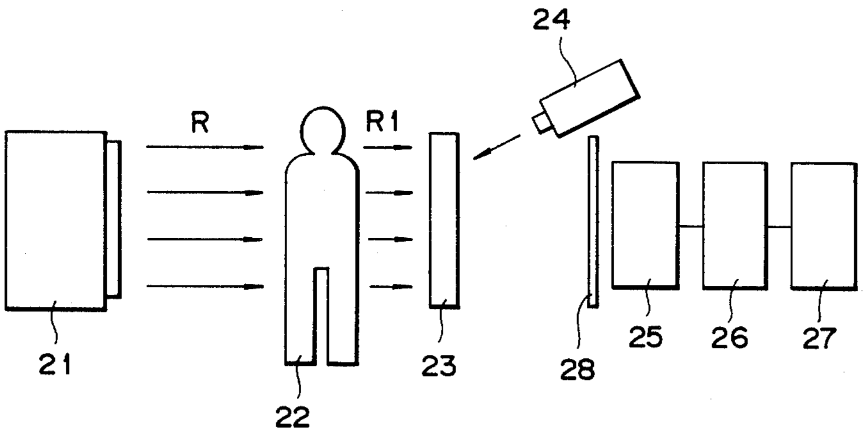
FIG. 2 is a schematic illustration of a radiation image storage method employed in this invention.

The radiation image storage panel of this invention can be employed in the radiation image storage method as schematically shown in FIG. 2. More specifically, in FIG. 2, 21 is a radiation generating device, 22 a subject, 23 a radiation image storage panel of this invention, 24 a stimulating excitation light source, 25 a photoelectric converting device for detection of the stimulated emission radiated from said radiation image storage panel, 26 a device for reproducing a signal detected on 25 as an image, 27 a device for displaying the reproduced image, and 28 a filter for separating the stimulating excitation light from stimulated emission to permit only the stimulated emission to be permeated therethrough. The devices of 25 et seq are not particularly limited to those as mentioned above, provided that they can reproduce the optical information from 23 as an image in some form.

As shown in FIG. 2, the radiation from the radiation generating device 21 passes through the subject 22 and enters the radiation image storage panel 23 of this invention. The incident radiation is absorbed by the stimulable phosphor layer of the radiation image storage panel 23, whereby its energy is accumulated to form an accumulated image of the radiation transmitted image. Next, the accumulated image is excited by the stimulating excitation light from the stimulating excitation light source 24 to be released as the stimulated emission. The radiation image storage panel 23 according to a preferred embodiment of this invention, since the stimulable phosphor layer contains no binder therein and whereby has high transparency, can be inhibited in diffusion of the stimulating excitation light within the stimulable phosphor layer during scanning by the above stimulating excitation light.

The intensity of the stimulated emission radiated is proportional to the radiation energy quantity accumulated, and the optical signal can be converted photoelectrically by means of, for example, a photoelectric converting device 25 such as a photomultiplier tube and reproduced by an image reproducing device 26 as an image, which is then displayed by an image displaying device, whereby the radiation transmitted image of the subject can be observed.

This invention is described by referring to the following Examples.

Example 1

An aluminum sheet with a thickness of 500 μm as the support was set in a deposition vessel. Next, an alkali halide stimulable phosphor (RbBr:0.01T1) was placed in a tungsten boat for resistance heating, set on the electrodes for resistance heating and subsequently the deposition vessel was evacuated to a vacuum degree of $2\times10^{-6}$ Torr.

Next, current was passed through the tungsten boat and the alkali halide stimulable phosphor was evaporated by the resistance heating method to deposit a stimulable phosphor layer to a layer thickness of 300 μm on the aluminum support to obtain a stimulable phosphor panel P as a base of a radiation image storage panel of this invention.

Then, nylon 12 adhesive was applied onto a face of nylon 66 film with a regain of 4.2% for the relative humidity of 90% on a sorption isotherm at 25° C. and a thickness of 10 μm, and sufficiently dried. The thus prepared film is adhered to a surface of the stimulable phosphor layer of the above stimulable phosphor panel P to form a first protective layer.

Further, a vinylidene chloride-vinyl chloride copoymer film with a regain of 0.4% for the relative humidity of 90% on a sorption isotherm at 25° C., a water vapor transmission rate of 91 $g/m^2$ 24 hrs at the temperature of 40° C. and at the relative humudity of 90% and a thickness of 10 μm was applied with an epoxy modified polyolefin series adhesive on one side of them, and then adhered onto the surface of the above formed first protective layer to form a second protective layer and thereby prepare a radiation image storage panel A of this invention.

Here, since adhesive layers existing between the stimulable phosphor layer and the first protective layer and between the first protective layer and the second protective layer each have a thickness of 2 μm or less, an influence on water vapor transmission and moisture absorption phenomena of these protective layers effected by water vapor permeation and moisture absorption phenomena of these adhesive layers could be ignored.

COMPARATIVE EXAMPLE 1

A radiation image storage panel A' for control was prepared in the same manner as in Example 1 except for making a protective layer by adhering a vinylidene chloride-vinyl chloride copolymer film as a protective layer with a thickness of 20 μm which had previously been provided with epoxy modified polyolefin series adhesive on one side of the film onto the stimulable phosphor layer of the stimulable phosphor panel P.

EXAMPLE 2

On the surface of the stimulable phosphor layer of the same stimulable phosphor panel P as employed in Example 1, sufficiently dried polyvinylalcohol film with a regain of 18.0% for the relative humidity of 90% on a sorption isotherm at 25° C. and a thickness of 20 μm which had previously been applied with a polyester series adhesive on one side of them was adhered to form a first protective layer.

Next, the following composition was dispersed in a ball mill to prepare a coating liquid for a second protective layer.

Bisphenol A diglycidyl ether: 75% by weight
3,4-epoxycyclohexyl methyl-carboxylate: 18% by weight
Triallylsulfonium hexafluoroantimon salt: 7% by weight The thus prepared coating liquid for a protective layer was applied on the first protective layer to a coated thickness of 10 μm by a Doctor coater. The thus applied layer was irradiated with ultraviolet ray for 10 seconds by means of a high pressure mercury vapor lamp developing output of 80 W/cm and thereby completely cured to form a second protective layer and prepare a radiation image storage panel B of this invention.

In this connection, the same film as the second layer was separately prepared and measured its water vapor transmission rate at the temperature of 40° C. and the relative humidity of 90% to find a value of 130 $g/m^2\cdot24$ hrs. And, a regain for the relative humidity of 90% on a sorption isotherm at 25° C. was 2.0%.

COMPARATIVE EXAMPLE 2

To a surface of the stimulable phosphor layer of the same stimulable phosphor panel P as employed in Example 1, the same coating liquid for the second protective layer as prepared in Example 2 was applied to a coating thickness of 30 μm by means of a Doctor coater.

The coated layer was irradiated with ultraviolet ray for 10 seconds by means of a high pressure mercury vapor lamp developing an output of 80 W/cm and thereby completely cured to form a protective layer and prepare a radiation image storage panel B' for control.

Thus prepared radiation image storage panels A and B of this invention and A' and B'0 for control were allowed to stand in a drying box for 2 days and then measured for their sensitivity to radiation. Next, these radiation image storage panels were allowed to stand for 350 hours in a thermo-hygrostat under the conditions at a temperature of 50° C. and at a relative humidity of 80% to be forced to deteriorate. Further, these radiation image storage panels were placed again in the drying box for 5 hours. The variation of radiation sensitivities of these panels were measured from the start of the deterioration in the thermo-hygrostat and indicated as a value relative to that assumed as 1.0 which is obtained at the begining of the deterioration. The result is shown in FIG. 3.

Figure 3:
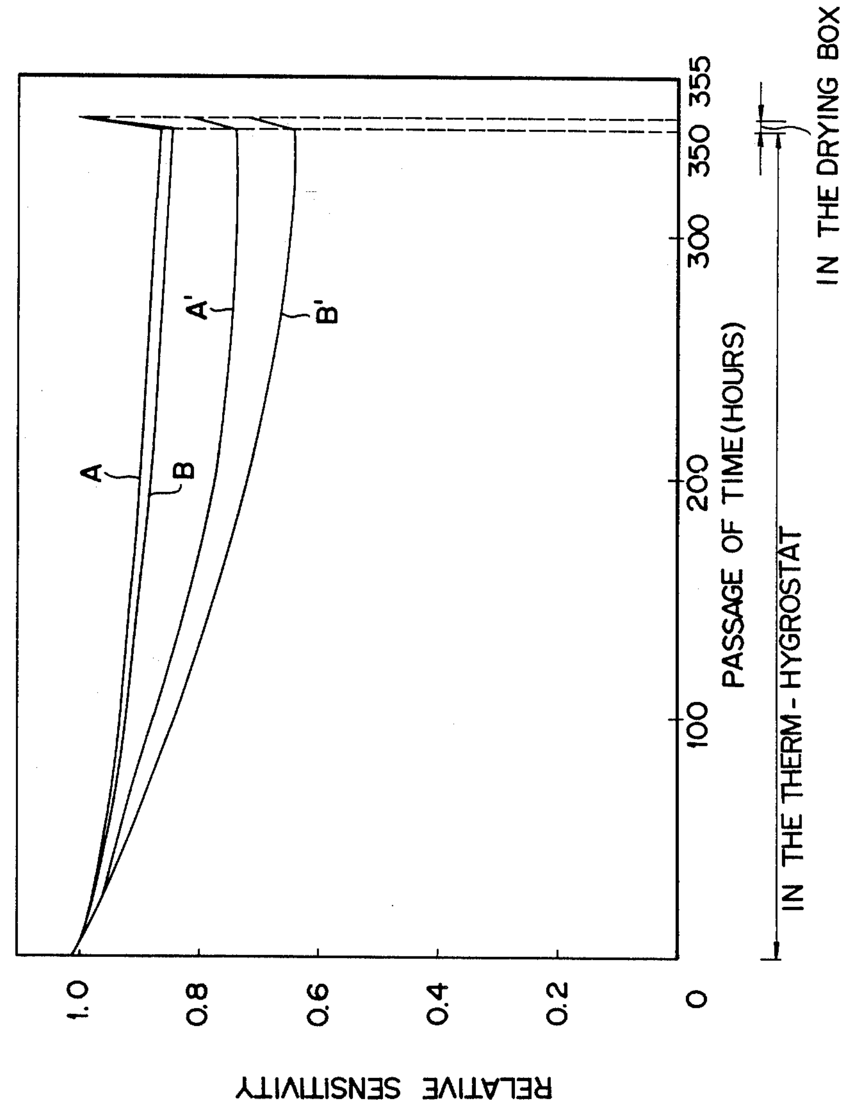
FIG. 3 is a graph showing variation of radiation sensitivity when the radiation image storage panel of this invention and those of the prior are allowed to stand in a thermo-hygrostat and then placed in a drying box.

As apparent from FIG. 3, it is observed that the reduction of the radiation sensitivity of the radiation image storage panels A and B of this invention due to moisture absorption of the stimulable phosphor layer are smaller as compared with those of the radiation image storage panels A' and B'. Further, the sensitivities of the radiation image storage panels A and B of this invention can be rapidly recovered after they are exposed to a low humidity atmosphere.

As described hereinbefore, since the radiation image storage panel of this invention comprises a protective layer having a composite structure constituted of two or more layers which are different by 0.5% or more in regains for the relative humidity of 90% on a sorption isotherm at 25° C., they are excellent in humidity resistance and can be used for a long term in good conditions.

We claim:

1. A radiation image storage panel having at least one stimulable phosphor layer on a support and a protective layer provided on said stimulable phosphor layer, wherein said protective layer comprises at least two layers of which regains under a relative humidity of 90% on a sorption isotherm at 25° C. are different by 0.5% or more; the layer having higher regain being provided on the stimulable phosphor layer and the layer having lower regain being provided on the layer having higher regain.

2. The radiation image storage panel according to claim 1, wherein one of said at least two layers having lower regain possesses a regain of 5% or less.

3. The radiation image storage panel according to claim 1, wherein one of said at least two layers having higher regain possesses a regain of more than 0.5%.

4. The radiation image storage panel according to claim 2, wherein said layer having lower regain comprises at least one selected from the group consisting of polyethylene, polytetrafluoroethylene, polytrifluoroethylenechloride, polypropylene, tetrafluoroethylenehexafluoropropylene copolymer, poly(vinylidene chloride), poly(vinyl isobutyl ether), polyethylene terephthalate, vinylidene chloride-vinyl chloride copolymer, vinylidene chloride-acrylonitrile copolymer, vinylidene chlorideisobutylene copolymer, polystyrene, poly(vinyl chloride), vinyl chloride-vinyl acetate copolymer, vinyl chloride-diethyl fumarate copolymer, polymethyl methacrylate, polyacrylonitrile, ethylcellulose, nitrocellulose, a part of epoxy series polymers and a part of acrylic polymer.

5. The radiation image storage panel according to claim 4, wherein said layer having lower regain comprises at least one selected from the group consisting of polyethylene, polytetrafluoroethylene, polytrifluoroethylenechloride, polypropylene, tetrafluoroethylenehexafluoropropylene copolymer, poly(vinylidene chloride), poly(vinyl isobutyl ether), polyethylene terephthalate, vinylidene chloride-vinyl chloride copolymer, vinylidene chloride-acrylonitrile copolymer, vinylidene chloride-isobutylene copolymer, polystyrene, a part of epoxy series polymers and a part of acrylic polymer.

6. The radiation image storage panel according to claim 1, wherein one of said at least two layers having higher regain comprises at least one selected from the group consisting of poly(vinyl alcohol), polyacrylamide, polyglycin, polymethacrylic acid, polyacrylic acid, poly(vinyl pyrrolidone), poly(vinylamine), cellulose diacetate, cellulose triacetate, nylon 4, nylon 6, nylon 12, nylon 66, poly(vinyl acetate), polymethylallyl alcohol, cellulose acetate, nitrocellulose, ethylcellulose, polyurethane, polymethylvinylketone, polyacrylonitrile, poly(methyl methacrylate), poly(vinyl chloride) and polyethylene terephthalate.

7. The radiation image storage panel according to claim 6, wherein said layer having higher regain comprises at least one selected from the group consisting of poly(vinyl alcohol), polyacrylamide, polyglycin, polymethacrylic acid, polyacrylic acid, poly(vinyl pyrrolidone), poly(vinylamine), cellulose diacetate; cellulose triacetate, nylon 4, nylon 6, nylon 12, nylon 66, poly(vinyl acetate) and polymethylallyl alcohol.

8. The radiation image storage panel according to claim 1, wherein the outermost protective layer of the protective layers has the water vapor transmission rate according to JIS (Japanese Industrial Standard) Z-208B of 500 $g/m^2 \cdot 24hrs$ or less at the temperature of 40° C. and at the relative humidity of 90%.

9. The radiation image storage panel according to claim 1, wherein the thickness of said protective layer containing at least two layers is within the range of from 1 to 100 μm.

10. The radiation image storage panel according to claim 9, wherein the thickness of the protective layer is within the range of from 2 to 50 μm.

11. The radiation image storage panel according to claim 1, wherein said stimulable phosphor layer comprises at least one selected from the group consisting of phosphors represented by:

$BaSO_4$:Ax (wherein A is at least one of Dy, Tb and Tm, x is $0.001 \leqq x < 1$ mole %);

$MgSO_4$:Ax (wherein A is Ho or Dy, x is $0.001 \leqq x \leqq 1$ mole %);

$SrSO_4$:Ax (wherein A is at least one of Dy, Tb and Tm, x is $0.001 \leqq x < 1$ mole %);

those in which at least one of Mn, Dy and Tb is added to $Na_2SO_4$, $CaSO_4$ and $BaSO_4$;

BeO, LiF, $MgSO_4$ and $CaF_2$;

$Li_2B_4O_7$:Cu, Ag;

$Li_2O.(B_2O_2)x$:Cu (wherein x is $2 < x \leqq 3$);

$Li_2O.(B_2O_2)x$:Cu,Ag (wherein x is $2 < x \leqq 3$);

SrS:Ce,Sm, SrS:Eu,Sm, $La_2O_2S$:Eu,Sm and (Zn, Cd)S:Mn,X (wherein X is a halogen)

ZnS:Cu,Pb;

$BaO.xAl_2O_3$:Eu (wherein $0.8 \leqq x \leqq 10$);

$M^{II}O.xSiO_2$:A (wherein $M^{II}$ is Mg, Ca, Sr, Zn, Cd or Ba; A is at least one of Co, Ib, Eu, Tm, Pb, Tl, Bi and Mn; and x is $0.5 < x < 2.5$); $(Ba_{1-x-y}Mg_xCa_y)FX$-:$eEu^{2+}$(wherein X is at least one of Br and Cl, each of x, y and e is a number satisfying the conditions of $0 < x+y \leqq 0.6$, $xy \neq 0$ and $10^{-6}$ and $10^{'6} < e$ $5 \times ^{10-2}$);

LnOX:xA (wherein Ln represents at least one of La, Y, Gd and Lu; X represents Cl and/or Br; A represents Ce and/or Tb; and x represents a number satisfying $0 < x < 0.1$);

$(Ba_{1-x}M^{II}x)FX$:yA (wherein $M^{II}$ represents at least one of Mg, Ca, Sr, Zn and Cd; X represents at least one of Cl, Br and I; A represents at least one of Eu, Tb, Ce, Tm, Dy, Pr, Ho, Nd, Yb and Er; x and y represent numbers satisfying the conditions of $0 \leqq x \leqq 0.6$ and $0 \leqq y \leqq 0.2$);

BaFX:xCe,yA (wherein X is at least one of Cl, Br and I; A is at least one of In, Tl, Gd, Sm and Zr; x and y are each $0 < x \leqq 2 \times 10^{-1}$ and $0 < y \leqq 5 \times 10^{-2}$);

$M^{II}FX$,xA:yLn (wherein $M^{II}$ is at least one of Mg, Ca, Ba, Sr, Zn and Cd; A is at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O_5$, $Ta_2O_5$ and $ThO_2$; Ln is at least one of Eu, Tb, Ce, Tm, Dy, Pr, Ho, Nd, Yb, Er, Sm and Gd; X is at least one of Cl, Br and I; x and y are each number satisfying the conditions of $5\times10^{-5}\leqq x\leqq 0.5$ and $0<y\leqq 0.2$);

ZnS:A, (Zn,Cd)S:A, CdS:A, ZnS:A,X and CdS:A,X (wherein A is Cu, Ag, Au or Mn; X is a halogen);

$xM_3(PO_4)_2$:yA and $M_3(PO_4)_2$:yA (wherein each of M and N represents at least one of Mg, Ca, Sr, Ba, Zn and Cd; X represents at least one of F, Cl, Br and I; A represents at least one of Eu, Tb, Ce, Tm, Dy, Pr, Ho, Nd, Yb, Er, Sb, Tl, Mn and Sn; x and y are integers satisfying the conditions of $0<x<6$ and $0<y\leqq 1$);

$nReX_3.mAX'_2$:xEu and $nReX_3.mAX'_2$:xEu,ySm (wherein Re represents at least one of La, Gd, Y and Lu; A represents at least one of alkaline earth metals Ba, Sr and Ca; X and X' each represent at least one of F, Cl and Br; and x and y are integers satisfying the conditions of $1\times10^{-4}<x<3\times10^{-1}$ and $1\times10^{-4}<y<1\times10^{-1}$; and n/m satisfies the condition of $1\times10^{-3}<n/m<7\times10^{-1}$) and $M^{I}X.aM^{II}X'_2bM^{III}X''_3$:cA (wherein $M^{I}$ is at least one alkali metal selected from Li, Na, K, Rb and Cs; $M^{II}$ is at least one divalent metal selected from Be, Mg, Ca, Sr, Ba, Zn, Cd, Cu and Ni; $M^{III}$ is at least one trivalent metal selected from Sc, Y, La, Ce, Pr, Nd, Pm, Sm, Eu, Gd, Tb, Dy, Ho, Er, Tm, Yb, Lu, Al, Ga and In; X, X' and X'' are each at least one halogen selected from F, Cl, Br and I; A is at least one metal selected from Eu, Tb, Ce, Tm, Dy, Pr, Ho, Nd, Yb, Er, Gd, Lu, Sm, Y, Tl, Na, Ag, Cu and Mg; a is a numeral within the range of $0<a<0.5$, b is a numeral within the range of $0<a<0.5$, and c is a numeral within the range of $0<c<0.2$).

* * * * *